P. T. DUNN.
DISH WASHING MACHINE.
APPLICATION FILED MAY 7, 1917.
1,243,925.
Patented Oct. 23, 1917.
3 SHEETS—SHEET 3.
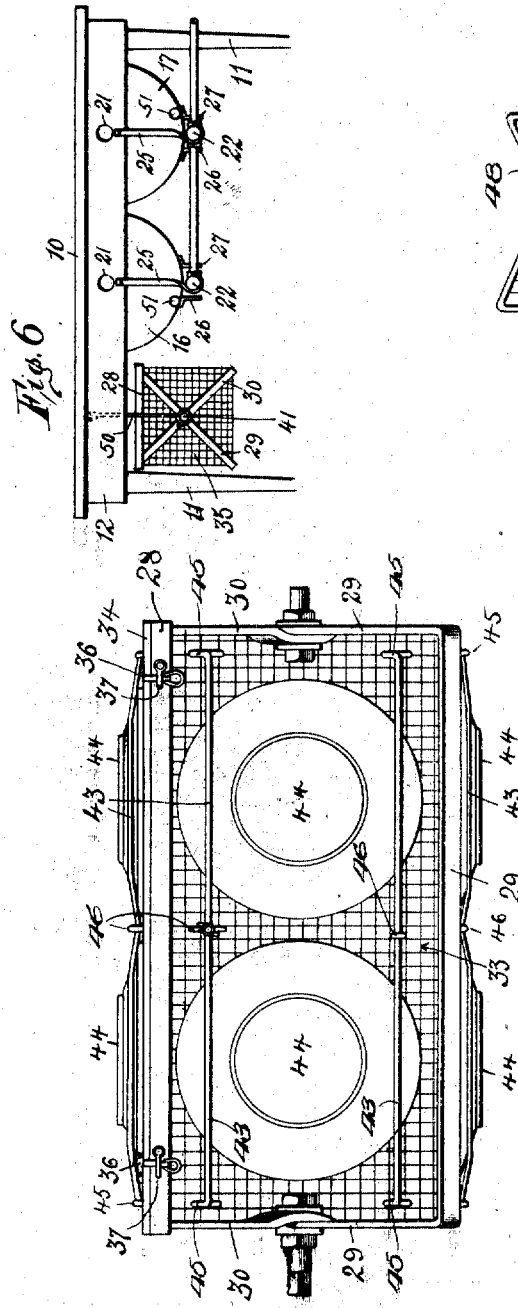
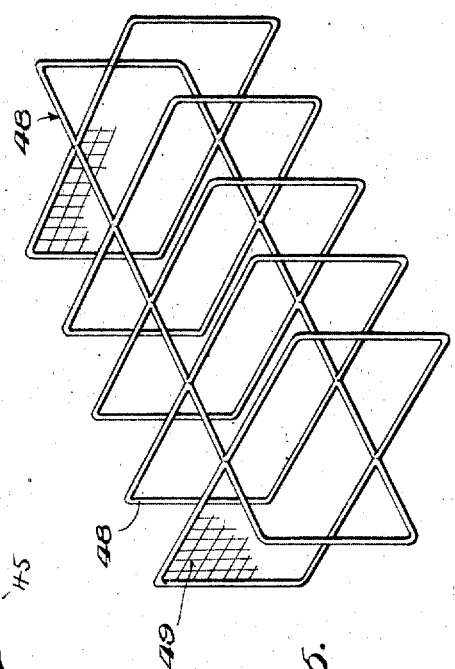
P. T. Dunn
INVENTOR
BY
ATTORNEYS

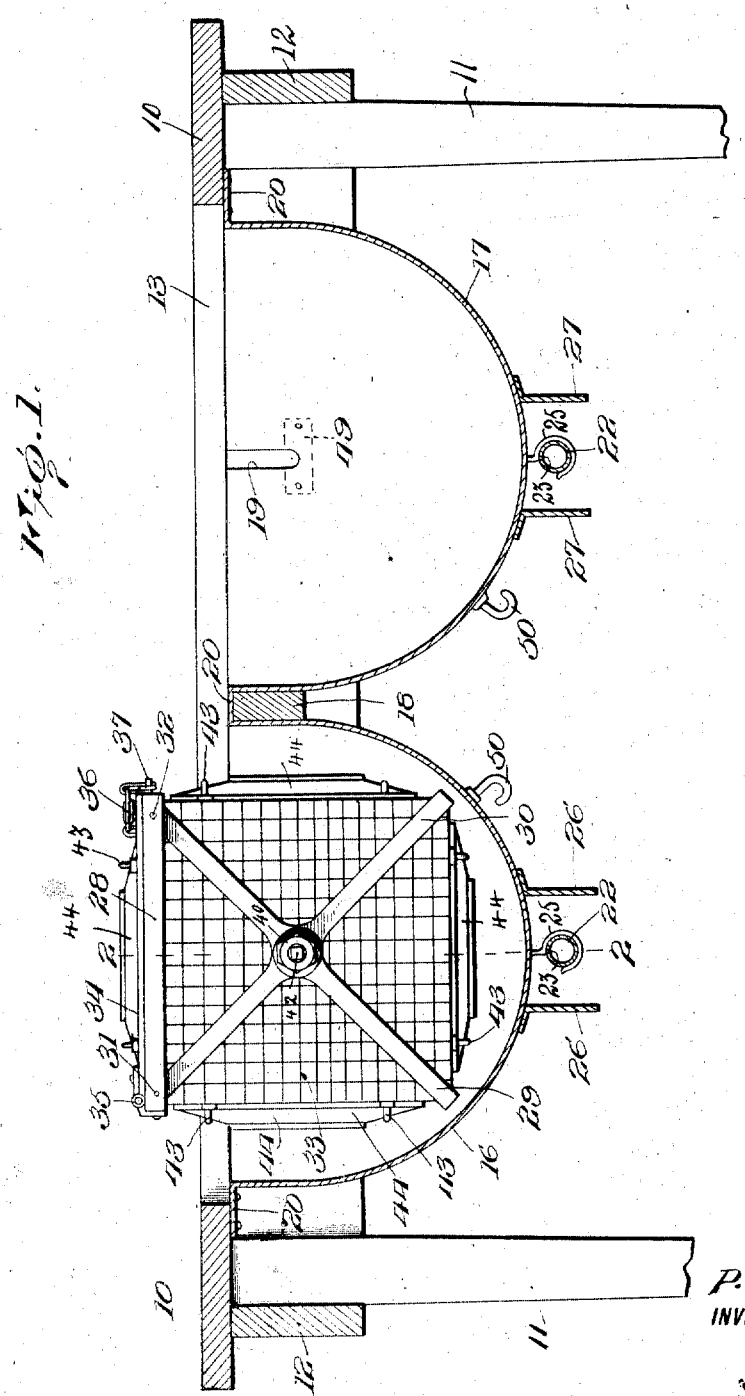

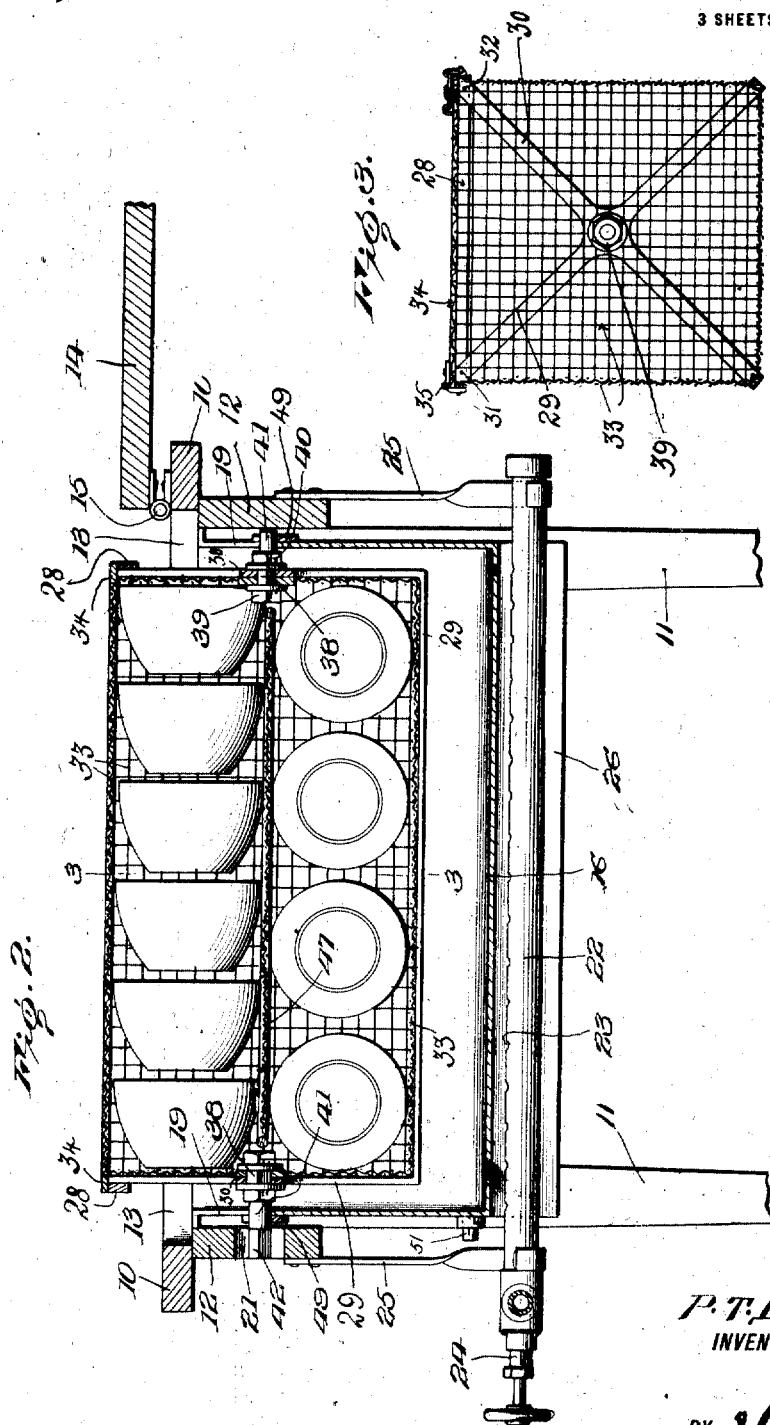

UNITED STATES PATENT OFFICE.

PATRICK T. DUNN, OF CEDAR RAPIDS, IOWA.

DISH-WASHING MACHINE.

1,243,925.   Specification of Letters Patent.   Patented Oct. 23, 1917.

Application filed May 7, 1917. Serial No. 166,993.

*To all whom it may concern:*

Be it known that I, PATRICK T. DUNN, a citizen of the United States, residing at Cedar Rapids, in the county of Linn and State of Iowa, have invented certain new and useful Improvements in Dish-Washing Machines, of which the following is a specification.

This invention relates to improvements in apparatus for washing dishes, and for like purposes, and has for one of its objects to improve the construction and increase the efficiency and utility of devices of this character.
Another object of the invention is to provide a device of this character whereby the dishes may be caused to pass through the cleansing liquid and agitated therein and then caused to pass through a rinsing liquid and subjected to heat for drying the same.

With these and other objects in view, the invention consists in certain novel features of construction, as hereinafter shown and described and then specifically pointed out in the claims; and in the drawings illustrative of the preferred embodiment of the invention—

Figure 1 is a view partly in section of the improved device;
Fig. 2 is a longitudinal section on the line 2—2 of Fig. 1;

Fig. 3 is a transverse section of the dish supporting cage on the line 3—3 of Fig. 2;

Fig. 4 is a side elevation of the dish supporting cage or basket;

Fig. 5 is a detached perspective view of the division member whereby the smaller sized dishes are maintained in separated position within the basket.
Fig. 6 is a side view on a reduced scale, illustrating a modified means for suspending the basket when not in use.

The improved device comprises coacting receptacles, one for the cleansing liquid and one for the rinsing liquid, and a basket of novel construction within and upon which the dishes are supported and mounted for rotation first within the receptacle containing the cleansing liquid and then in the receptacle containing the rinsing liquid, and means for applying heat to the receptacle containing the cleansing liquid, and means for applying heat to the vessel containing the rinsing liquid, the latter heat imparting medium being likewise adapted to dry the dishes after being rinsed.

The receptacles for the cleansing liquid and the rinsing liquid are preferably arranged side by side, or in convenient position to enable the basket containing the dishes to be readily inserted in either one of the receptacles. The receptacles will preferably be arranged in connection with an ordinary kitchen table, but not necessarily limited to any specific form of table or other support. For the purpose of illustration the improved device is shown arranged in connection with a conventional kitchen table, the latter comprising a top member 10 supported by legs 11 and having usual "skirt" members 12. The top 10 is provided with a relatively long opening indicated at 13, the opening provided with a suitable closure, a portion of which is shown at 14, and hingedly united to the top 10 at 15. By this means the opening 13 may be closed when the improved device is not in use.

The top of the improved device is thus rendered continuous and in the form of an ordinary table top when not employed as a support for the dish washing apparatus.

The receptacle for the cleansing liquid is represented at 16, while the receptacle for the rinsing liquid is represented at 17, the receptacles being preferably semi-cylindrical in form. When employed in connection with the table 10 a transverse support 18 is employed between the receptacles. The receptacles 16—17 are closed at the ends and open at the top and communicate with the opening 13. The receptacles are greater in depth than half of a circle and are provided with upwardly opening seats one of which is represented at 19, to receive trunnions on the dish supporting basket, as hereinafter explained. The receptacles may be of any required size but for an ordinary sized device the radius of the curved portion of the receptacle will be about seven inches, while the total height will be about nine inches, but these dimensions may be varied as required. At their upper edges the members 16—17 are formed with lateral flanges 20 to bear beneath the top 10 and over the upper edge of the division member 18 as shown in Fig. 1, and attached to the table top and to the division member by suitable fastening devices such as screws or nails. At one side the skirt member 12 of the table is provided with relatively large openings, one of which is shown at 21 opposite one pair of the sockets 19, to enable an operating crank to be inserted to engage the dish supporting basket and rotate the same, as hereinafter explained.

Suspended beneath the receptacle 16 is a burner device indicated at 22, while a similar burner device is supported beneath the receptacle 17. For the purpose of illustration the burner device is shown in the form of a tube having a plurality of gas orifices 23 and each burner device provided with a controlling valve, one of which is represented at 24. The burner devices are shown suspended from the skirt member 12 of the table by hangers 25. Deflector plates 26—27 depend respectively from the receptacles 16—17, to confine the flames and heat units rising from the burners and causing them to impinge with greater force against the receptacles and thus impart the necessary heat to the cleansing and rinsing liquids. The receptacles 16—17 are precisely alike and either one thus adapted to receive the cleansing liquid or the rinsing liquid.

The basket or container for the dishes to be washed comprises an oblong metal frame represented as a whole at 28 and forming a band or support at the upper edge of the basket. Relatively long U-shaped frames 29—30 are provided and extend longitudinally of the lower corners of the basket and obliquely across the ends of the same, and cross centrally of the ends of the basket. The terminals of the frames 29—30 are riveted or otherwise rigidly secured at 31—32 to the frame 28 at its corners. The frame members 28—29—30 thus form a strong and rigid supporting frame for the walls of the basket which are formed of relatively heavy coarse wire screen material indicated at 33, the screen material being riveted or otherwise secured to the frame members 28—29—30. A closure is provided for the open side of the basket and comprises an inclosing frame represented at 34, the frame members forming a support for the screen material 33 of the top. Thus the sides, bottom and top and the ends of the basket are formed principally of the screen material and suitably supported by the frame members 28—29—30 and 34. The frame member 34 of the top is hingedly united at 35 to the frame 28 at one side and provided with short sections of chain 36 at the other side, the latter adapted to be engaged by one of its links beneath a hook-like device 37 extending from the frame 28.

Extending through the members 29—30 at their crossing points are combined clamp devices and trunnions shown more particularly in Fig. 2. The apertures through the members 29—30 at their crossed points are square, and the clamp members are likewise square where they pass through the openings in the frame members, as shown at 38. The combined clamp and trunnion members are threaded to receive clamp nuts 39—40 at opposite sides of the members 29—30 so that the combined trunnion and clamp members are firmly united to the basket frames. The combined clamping and trunnion members are each provided with a bearing 41 to engage in the sockets 19 as shown in Fig. 2, and one of the combined clamping and trunnion members is extended and formed square, as shown at 42 to receive a turning crank whereby the basket may be rotated. The squared portions 42 of the combined clamping and trunnion members are adapted to extend through the openings 21 in the skirt member 12 of the table, as shown in Fig. 2. Thus when the basket device is mounted for rotation in the receptacle 16 the squared portion 42 will extend through one of the openings 21 and then when the basket device is mounted for rotation in the other receptacle 17 the squared portion 42 will extend through the other opening 21. By this means the basket device may be rotated within either one of the receptacles.

Attached to the sides, bottom and top of the basket are supporting wires indicated at 43 in position to support dishes of plate-like form, represented at 44, as shown more particularly in Figs. 1 and 4. Generally the basket device will be large enough to hold two plates upon each side, bottom and top, and the wire supports 43 will be connected at the ends as shown at 45 to the wire screen material 33 and likewise at an intermediate point, as shown at 46. One of the holding devices 46 at each side, bottom and top will be in the form of a movable hook, so that after the dishes are located in position a sufficient strain may be applied to one of the holding wires to hold the dishes in position and prevent their displacement when the basket is rotated. The remaining dishes to be washed, such as saucers, tea-cups and the like will be located within the basket, and may be arranged in any suitable manner. To enable the smaller dishes, such as saucers, tea-cups and the like to be held in position a plurality of diaphragm-like devices, one of which is indicated at 47, will be furnished with each basket and corresponding in outline to the interior of the basket and adapted to be disposed between the layers of dishes, to prevent them from becoming disarranged when the basket is rotated. Any required number of the members 47 may be employed depending upon the sizes and forms of the dishes. The device illustrated in Fig. 5 may also be employed comprising a plurality of oblong metal frames 48 covered with the screen material 49 and arranged to form a plurality of pockets or compartments in which the smaller dishes may be disposed and prevent them from being displaced when the basket is rotated. The dishes to be washed will be arranged in close proximity within the basket and the division members 47 and 48 employed as required. In using the improved device the closure 14 is turned back out of the way and a supply of cleansing liquid deposited within the receptacle 16 or 17 as the case may be and the rinsing liquid deposited in the other receptacle. The burners 22 are then ignited to heat the liquids to the required degree. The dishes to be cleansed are then deposited within the basket as above described and the cover 34 secured in place. The basket is then deposited within the receptacle which contains the cleansing liquid and the turning crank applied to the member 42 and the basket rotated, the rotation of the basket causing the dishes to pass through the cleansing liquid successively, the rotative movement also causing the dishes to pass with considerable force through the cleansing liquid, and if necessary the motion may be reversed to cause the dishes to pass through the cleansing liquid in opposite directions. The liquid is thus thrown with considerable force against the dishes to thoroughly cleanse them. After the dishes have been cleansed the basket is lifted out of the receptacle containing the cleansing liquid and deposited within the receptacle containing the rinsing liquid and the rotating action repeated until the dishes are thoroughly rinsed. If required the rinsing liquid is then withdrawn from the receptacle in which it has been deposited and the basket permitted to remain until the heat rising from the burner thoroughly dries the dishes. Reinforcing members of suitable thickness of metal, indicated at 49 are applied to the ends of the receptacle 16—17 to reinforce these members where the rotating portion of the trunnions are rotated.

The metal portions of the device will preferably be galvanized or otherwise treated to prevent corrosion. After the washing operation is completed the basket is removed and the cover 14 of the opening 13 closed, thus restoring the table to its condition as a table, the presence of the receptacle 16—17 not interfering with the ordinary uses of the table. When not in use the cage may be suspended from hooks indicated at 50, beneath the table top.

A suitable draw-off device, such as a plug 51 will be provided for each of the receptacles 16—17.

In Fig. 6 the suspension devices 50 for the basket when not in use are shown attached to the top 10 of the table at one side of the receptacle 16 instead of between the receptacles.

Having thus described the invention, what is claimed as new is:

1. In an apparatus of the class described a holder for the dishes to be cleansed including a supporting frame and foraminous walls, a plurality of dish engaging rods in spaced relation connected at their ends to walls of the holder, and means applied to the rods intermediate their ends for drawing the same toward the adjacent wall of the holder.

2. In an apparatus of the class described a holder for the dishes to be cleansed comprising an oblong top frame, U shaped members connected to the top frame and crossed at the ends of the holder, fastening devices extending through the U shaped frame members at their crossing points and each extended into a trunnion whereby the holder may be supported for rotation, bottom, side and end walls of screen material connected to the top and the U shaped frame members, and a closure comprising a frame conforming to the top frame and having screen material connected thereto.

3. An apparatus of the class described comprising a receptacle for a cleansing liquid including end members having upwardly opening bearing slots, a holder for the dishes comprising an oblong top frame, U shaped members connected to the top frame and crossed at the ends of the holder, fastening devices extending through the U shaped frame members at their crossing points and each extended into a trunnion engaging in the slots, and thereby supporting the holder for rotation in the receptacle.

In testimony whereof I affix my signature.

PATRICK T. DUNN. [L. S.]